(12) United States Patent
Bea

(10) Patent No.: US 10,320,953 B2
(45) Date of Patent: Jun. 11, 2019

(54) USER DATAGRAM PROTOCOL NETWORKING METHOD FOR STABILITY IMPROVEMENT

(71) Applicant: NETTENTION CO., LTD., Seoul (KR)

(72) Inventor: Hyun-Jik Bea, Seoul (KR)

(*) Notice: Subject to any disclaimer, the term of this patent is extended or adjusted under 35 U.S.C. 154(b) by 51 days.

(21) Appl. No.: 15/321,939

(22) PCT Filed: Nov. 4, 2014

(86) PCT No.: PCT/KR2014/010507
§ 371 (c)(1),
(2) Date: Dec. 23, 2016

(87) PCT Pub. No.: WO2015/199290
PCT Pub. Date: Dec. 30, 2015

(65) Prior Publication Data
US 2017/0187844 A1    Jun. 29, 2017

(30) Foreign Application Priority Data
Jun. 25, 2014 (KR) .................. 10-2014-0078007

(51) Int. Cl.
*H04L 12/28* (2006.01)
*H04L 29/06* (2006.01)
(Continued)

(52) U.S. Cl.
CPC ............ *H04L 69/161* (2013.01); *H04L 47/35* (2013.01); *H04L 47/38* (2013.01); *H04L 49/557* (2013.01); *H04L 69/166* (2013.01); *H04L 1/1607* (2013.01)

(58) Field of Classification Search
CPC ..................................................... H04L 49/557
See application file for complete search history.

(56) References Cited

U.S. PATENT DOCUMENTS

| | | | |
|---|---|---|---|
| 6,850,519 B1* | 2/2005 | Saito | H04L 1/007 370/389 |
| 2002/0054578 A1* | 5/2002 | Zhang | H04L 1/0001 370/328 |

(Continued)

OTHER PUBLICATIONS

English translation of 10-2011-0017518.
(Continued)

*Primary Examiner* — Farah Faroul
(74) *Attorney, Agent, or Firm* — Antonio Ha & U.S. Patent, LLC (57) ABSTRACT

The present invention relates to a UDP networking method which improves the stability against a data damage occurring during a transmission by configuring an additional header area in a UDP transmission packet. The UDP (User Datagram Protocol) networking method for stability improvement may include the steps of: (A) generating, by a transmission terminal, a UDP packet by fragmenting transmission data on a packet basis; (B) transmitting, by the transmission terminal, the generated UDP packet to a reception terminal; (C) determining, by the reception terminal, whether the received UDP packet has an error; (D) storing, by the reception terminal, error information on UDP packet reception and detecting an error pattern; (E) transmitting, by the reception terminal, the detected error pattern to the transmission terminal; and (F) resetting, by the transmission terminal, a packet transmission pattern by reflecting the error pattern. The present invention can ensure stability in processing of repeatedly received data.

14 Claims, 5 Drawing Sheets

(51) Int. Cl.
*H04L 12/939* (2013.01)
*H04L 12/801* (2013.01)
*H04L 12/811* (2013.01)
*H04L 1/16* (2006.01)

(56) References Cited

U.S. PATENT DOCUMENTS

| | | | | |
|---|---|---|---|---|
| 2003/0126272 A1* | 7/2003 | Corl, Jr. | ............... | H04L 47/10 |
| | | | | 709/230 |
| 2003/0223433 A1* | 12/2003 | Lee | ............... | H04L 69/16 |
| | | | | 370/395.52 |
| 2006/0126510 A1* | 6/2006 | Russell | ............... | H04L 1/0083 |
| | | | | 370/235 |
| 2006/0133338 A1* | 6/2006 | Reznik | ............... | H04L 27/3477 |
| | | | | 370/338 |
| 2007/0036353 A1* | 2/2007 | Reznik | ............... | H04B 7/0434 |
| | | | | 380/30 |
| 2010/0246602 A1* | 9/2010 | Barreto | ............... | H04L 49/90 |
| | | | | 370/466 |
| 2012/0124442 A1* | 5/2012 | Strauss | ............... | G06F 11/0727 |
| | | | | 714/746 |
| 2012/0192045 A1* | 7/2012 | Sawada | ............... | G06F 11/1004 |
| | | | | 714/807 |
| 2013/0208630 A1* | 8/2013 | Bobrek | ............... | H04L 67/12 |
| | | | | 370/276 |
| 2013/0262122 A1* | 10/2013 | Kim | ............... | G10L 19/02 |
| | | | | 704/268 |
| 2014/0245114 A1* | 8/2014 | Thaler | ............... | H04L 45/30 |
| | | | | 714/807 |

OTHER PUBLICATIONS

English translation of 10-2010-0075292.
English translation of 10-2012-0044674.
English translation of 10-2012-0053756.
English translation of 10-2012-0068526.

* cited by examiner

USER DATAGRAM PROTOCOL NETWORKING METHOD FOR STABILITY IMPROVEMENT

TECHNICAL FIELD

The present disclosure relates to a UDP (User Datagram Protocol) networking method, and more particularly, to a UDP networking method which improves the stability against a data damage occurring during transmission by configuring an additional heater area in a UDP transmission packet.

BACKGROUND ART

A communication method for data communication on a network is divided into a reliability-guaranteed protocol and an unreliable protocol, depending on whether the reliability of transmission data is guaranteed.

The reliability-guaranteed protocol indicates a protocol which retransmits a frame which was lost during transmission or not transmitted due to a communication trouble, using a response frame to a transmission frame. Thus, a receiver side checks the order of the frames and recombines the frames. Then, the receiver side checks a frame lost in the middle, and re-receives the corresponding frame, thereby receiving complete data. Representative examples of the reliability-guaranteed protocol may include TCP (Transmission Control Protocol).

The unreliable protocol does not guarantee the reliability of transmission like broadcasting, but one-sidedly transmits data. Representative examples of the unreliable protocol may include UDP (User Datagram Protocol).

Recently, with the rapid spread of wireless communication terminals, the wireless Internet environment has spread worldwide. However, the quality of the wireless Internet environment is yet lower than that of the wired network.

Furthermore, with the spread of cloud servers and the like, more and more global suppliers have tended to provide a service to global consumers, and the increase in number of routers between terminals during a communication process between the terminals has reduced the network quality. In particular, while the number of smart phones and network-aware devices is rapidly increased, the NAT (Network Address Translation) requirements of the routers have become complicated. Thus, problems related to the network quality have increased.

In the TCP capable of guaranteeing the reliability, the problem related to the network quality has been significantly improved by the efforts of network equipment suppliers for compatibility and stability. However, in the UDP which cannot guarantee the reliability, various errors occur.

Furthermore, a network router or switch does not transmit and receive data of which the size is equal to or more than an MTU size of approximately 1,300 bytes, but tends to discard the data. Thus, in order to transmit and receive a datagram of which the size is equal to or more than the MTU size, a transmission side fragments the datagram, assigns fragment serial numbers to the fragmented datagrams, and transmits the fragmented datagrams to a reception side through UDP. Then, the reception side receives the datagrams and defragments the received datagrams.

When a predetermined pattern occurs in transmission data, a specific firewall blocks the transmission data. Since a specific pattern may be generated by the above-described serial numbers, the specific firewall blocks the data.

Representative examples of the specific firewall may include 'Great Firewall of China' which is a super-sized firewall constructed by China.

Korean Patent Publication No. 10-2012-0068526 has disclosed a data transmission system and method for improving the reliability of a UDP network.

Figure 1:
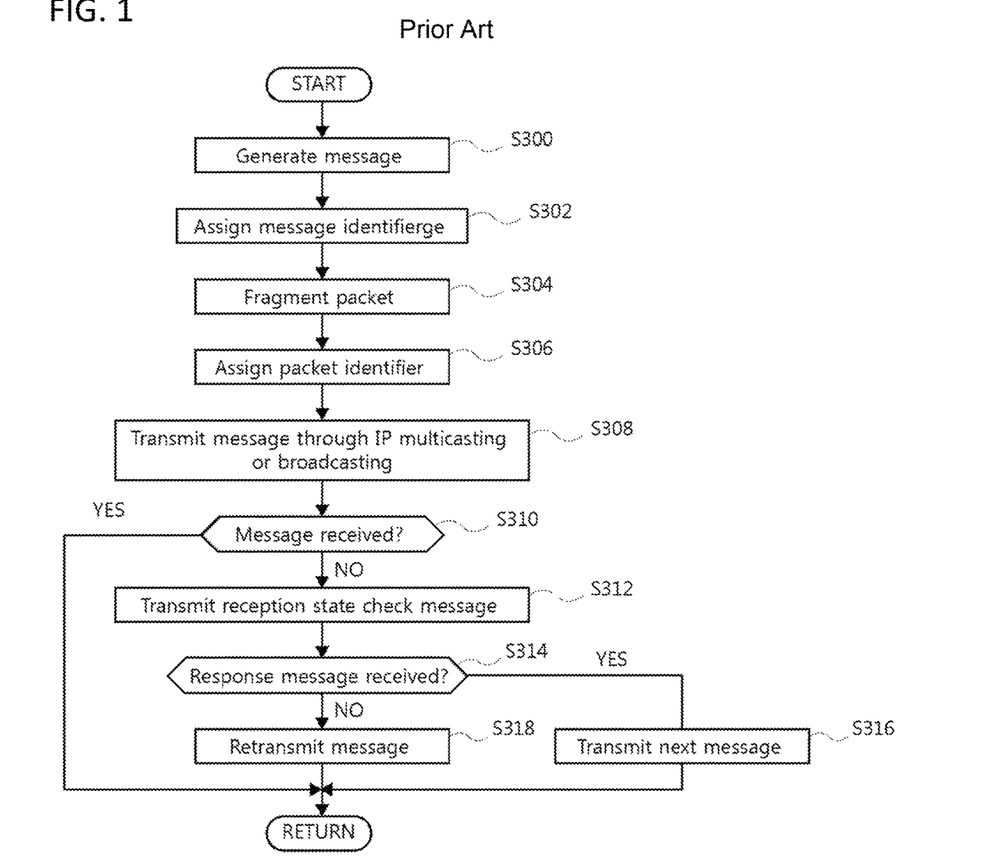
FIG. 1 is a flowchart illustrating a UDP-based data transmission method according to the related art.

As illustrated in FIG. 1, the UDP data transmission system according to the related art is a message transmission system for providing a UDP-based reliable communication service in a communication system which includes IP multicasting or broadcasting for a plurality of receivers. Before the UDP data transmission system transmits data through UDP, an application service fragments a message according to a size of one packet, assigns serial numbers and a destination ID to the fragmented packets, and transmits the packets to a local network through multicasting. Then, a reception side determines whether the destination ID is identical to the ID of the reception side, and determines whether the message is partly omitted, through the assigned serial numbers. If necessary, the reception side transmits a control message to the transmission side, and re-receives an omitted packet, which makes it possible to improve the reliability.

However, the related art has the following problems.

When the reception side transmits the control message to the transmission side in order to re-receive the omitted packet, the same effect as TCP occurs. In other words, the real time flexibility which is a unique advantage of UDP becomes meaningless.

Furthermore, the transmission packets to which the destination ID and the serial numbers are added may form a specific pattern. Thus, when the transmission packets pass through the above-described specific firewall, the corresponding packets may be blocked.

DISCLOSURE

Technical Problem various embodiments are directed to a UDP networking method which can ensure stability in processing of repeatedly received data by adding a specific header area to a UDP packet, and implement UDP networking by analyzing error analysis of an omitted and damaged packet.

Also, various embodiments are directed to a UDP networking method which can prevent a packet from being blocked or damaged by a firewall due to a pattern formation in a specific header area added to a transmission packet.

Technical Solution

In an embodiment, a UDP networking method for stability improvement may include the steps of: (A) generating, by a transmission terminal, a UDP packet by fragmenting transmission data on a packet basis; (B) transmitting, by the transmission terminal, the generated UDP packet to a reception terminal; (C) determining, by the reception terminal, whether the received UDP packet has an error; (D) storing, by the reception terminal, error information on UDP packet reception and detecting an error pattern; (E) transmitting, by the reception terminal, the detected error pattern to the transmission terminal; and (F) resetting, by the transmission terminal, a packet transmission pattern by reflecting the error pattern.

Advantageous Effects

The UDP networking method for stability improvement according to the embodiment of the present invention can have the following effects.

The UDP networking method can add a specific header area containing sequence data to a UDP packet, and ensure stability in processing of repeatedly received data, and the reception terminal (peer) can transmit an error analysis result on an omission and damage of a packet to the transmission terminal, and correct a transmission pattern. Thus, the UDP networking method can improve the stability against a packet omission and damage while maintaining the real time flexibility which is a unique advantage of UDP.

Furthermore, the UDP networking method can prevent a pattern formation of a specific header area added to a transmission packet, thereby preventing packet blocking by a firewall.

BEST MODE FOR INVENTION

A UDP networking method may include the steps of: (A) generating, by a transmission terminal, a UDP packet by fragmenting transmission data on a packet basis; (B) transmitting, by the transmission terminal, the generated UDP packet to a reception terminal; (C) determining, by the reception terminal, whether the received UDP packet has an error; (D) storing, by the reception terminal, error information on UDP packet reception and detecting an error pattern; (E) transmitting, by the reception terminal, the detected error pattern to the transmission terminal; and (F) resetting, by the transmission terminal, a packet transmission pattern by reflecting the error pattern.

The step (A) may include the steps of: (A1) fragmenting the transmission data into one or more UDP packets according to the UDP rule; (A2) generating sequence data indicating the serial numbers of the fragmented UDP packets; (A3) calculating transmission/reception hash data by performing a hash operation on data obtained by combining a transmission terminal ID and a reception terminal ID; (A4) calculating garbling data by combining the sequence data and the transmission/reception hash data; and (A5) generating an H header by combining the sequence data, the transmission/reception data and the garbling data, and inserting the H header into the fragmented UDP packets.

The transmission/reception hash data may be generated through an operation of combining the transmission terminal ID and the reception terminal ID into a preset length and hashing the combined information through an XOR operation.

The garbling data may include one-byte data calculated by performing an XOR operation on the first byte of the sequence data and the first byte of the transmission/reception hash data.

The H header may include the garbling data, the sequence data and the transmission/reception hash data which are sequentially arranged with the garbling data set to the head thereof.

The H header may include the garbling data coupled to the head of the transmission/reception hash data, and the sequence data may be recorded to the UDP L4 header formed in the UDP packet.

The step (C) may include the steps of: (C1) checking the reception terminal through the transmission/reception hash data of the received UDP packet, and determining whether a transmission address has an error; (C2) checking the reception terminal through the transmission/reception hash data of the received UDP packet, and determining whether a transmission address has an error; (C3) determining whether omitted packets are present, based on the sequence data of the received UDP packets; and (C4) checking the received UDP packets to determine whether the received UDP packets are damaged.

The error pattern of the step (E) may include a time-based occurrence cycle of a packet transmission error, the packet transmission pattern, may include a damage or omission of a received packet, and the step (F) may include setting a time step for packet transmission at a time cycle corresponding to the occurrence cycle of the packet transmission error.

The error pattern of the step (E) may include an occurrence cycle of a packet transmission error based on the amount of transmitted packets, the packet transmission error may include a damage or omission of a received packet, and the step (F) may include setting a time step for packet transmission at a packet transmission cycle corresponding to the occurrence cycle of the packet transmission error.

Mode for Invention

Hereafter, a UDP networking method for stability improvement according to an embodiment of the present invention will be described with reference to the accompanying drawings.

The effects and features of the present invention and the method for accomplishing the effects and features will be clarified through embodiments which are described below in detail. However, the present invention may be embodied in different forms and should not be construed as limited to the embodiments set forth herein. Rather, these embodiments are provided so that this disclosure will be thorough and complete, and will fully convey the scope of the present invention to those skilled in the art. The present invention is only defined by the scope of claims.

Moreover, detailed descriptions related to well-known functions or configurations will be ruled out in order not to unnecessarily obscure subject matters of the present invention, and terms described later are defined in consideration of functions in the embodiments of the present invention, and may differ depending on the practice or the intention of a user or operator. Therefore, the terms should be defined based on the entire contents of this specification.

Combinations of blocks in the accompanying block diagrams or steps in the accompanying flowcharts can be executed by computer program instructions (execution engine), and the computer program instructions can be mounted in a processor of a general-use computer, special-use computer or other programmable data processing equipment. Thus, the instructions executed through the processor of the computer or other programmable data processing equipment generate units for performing functions described in the respective blocks of the block diagrams or the respective steps of the flowcharts.

The computer program instructions can be stored in a computer usable or readable memory oriented to a computer or other programmable data processing equipment, in order to implement functions in a specific method. Thus, the instructions stored in the computer usable or readable memory can be used to manufacture products including instruction units for performing the functions described in the respective blocks of the block diagrams or the respective steps of the flowcharts.

As described above, the computer program instructions can be mounted in the computer or other programmable data processing equipment. Therefore, instructions which generate processes by performing a series of operation steps on the computer or other programmable data processing equipment and operate the computer or other programmable data processing equipment can provide steps for executing the functions described in the respective blocks of the block diagrams and the respective steps of the flowcharts.

Each of the blocks or steps may indicate a part of a module, segment or code including one or more executable instructions for executing specific logical functions. In some substitutions, the functions described in the blocks or steps can be performed out of sequence.

That is, two blocks or steps can be operated or performed substantially at the same time, and the blocks or steps can be operated or performed in the reverse order of the corresponding function.

Figure 2:
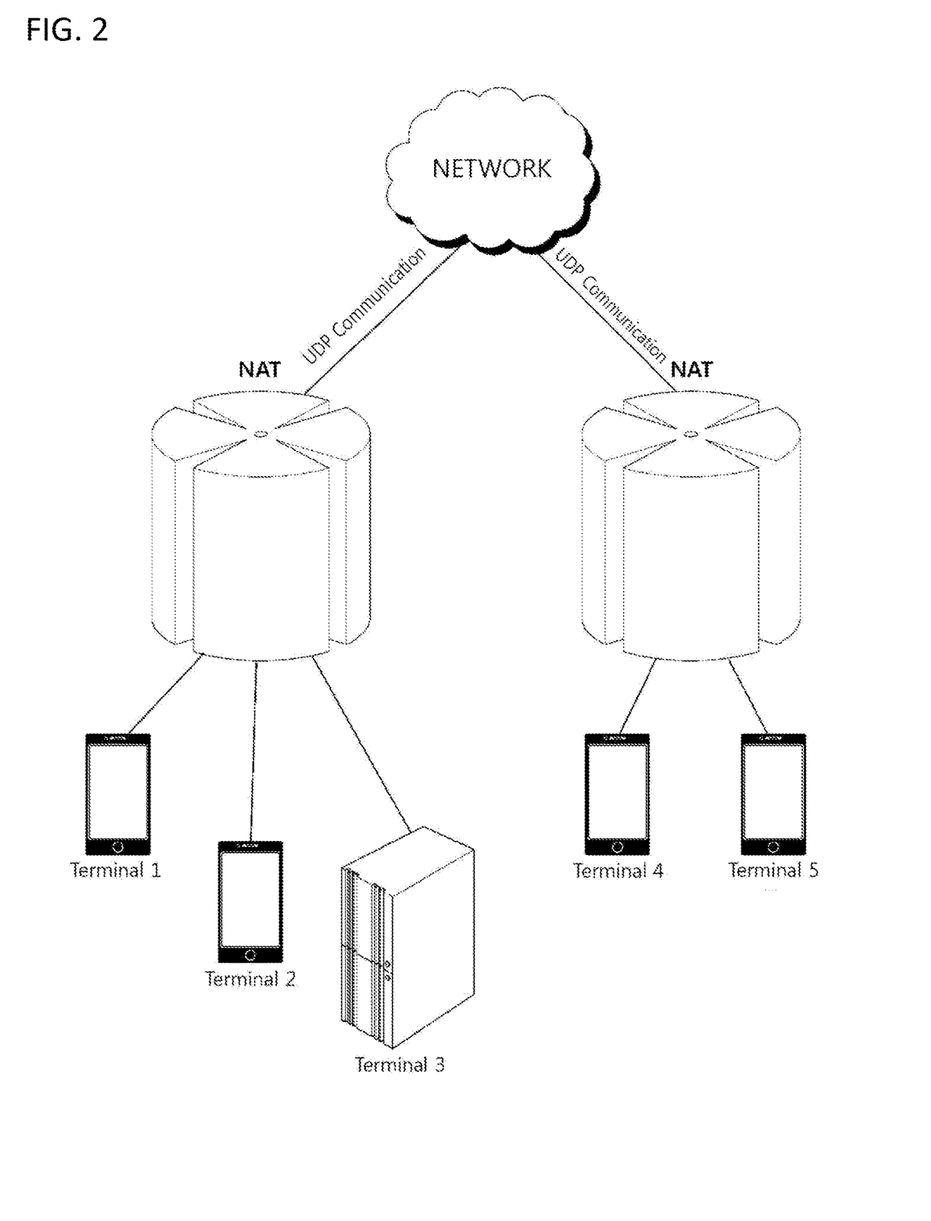
FIG. 2 is a conceptual view illustrating a UDP network according to an embodiment of the present invention.
Figure 3:
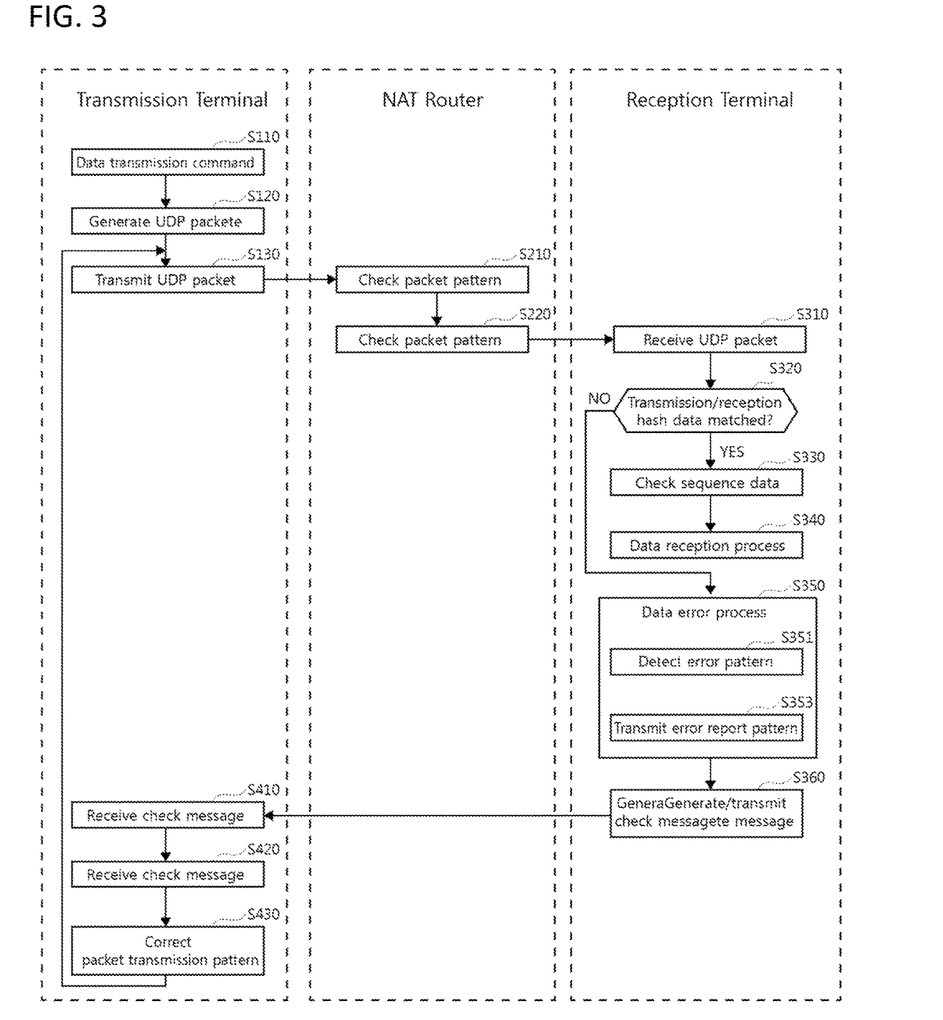
FIG. 3 is a flowchart illustrating a UDP networking method according to an embodiment of the present invention.
Figure 4:
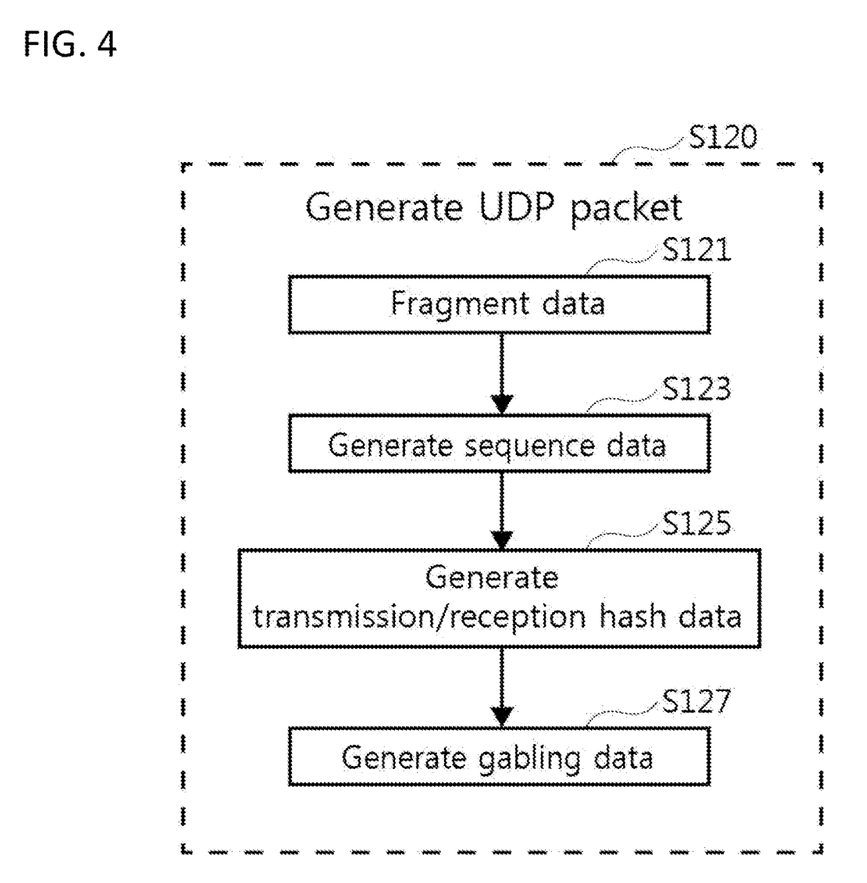
FIG. 4 is a diagram illustrating an example of a UDP packet configuration according to the embodiment of the present invention.
Figure 5:
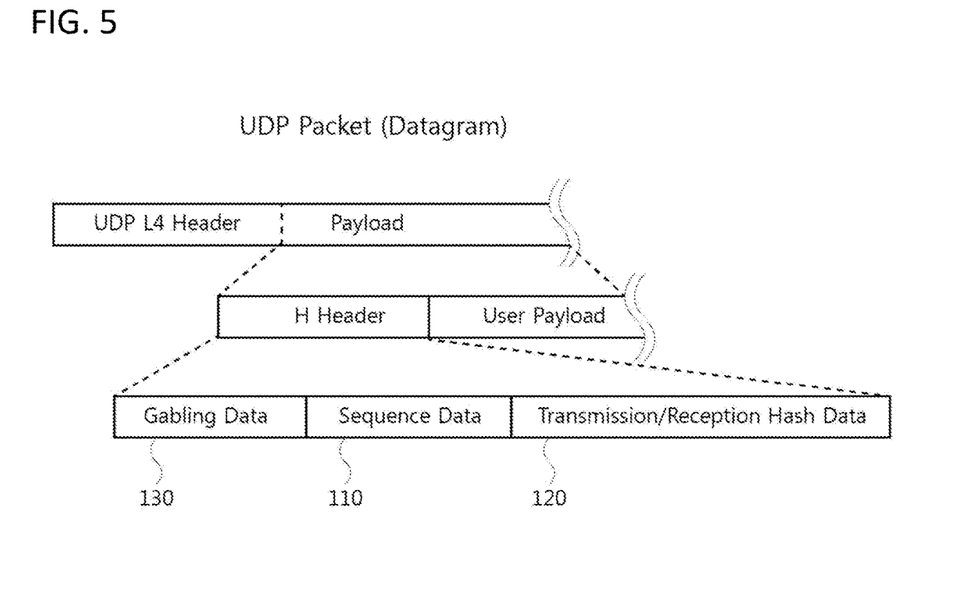
FIG. 5 is a flowchart illustrating a UDP packet generation process in the UDP networking method according to the embodiment of the present invention.

FIG. 2 is a conceptual view illustrating a UDP network according to an embodiment of the present invention. FIG. 3 is a flowchart illustrating a UDP networking method according to an embodiment of the present invention. FIG. 4 is a diagram illustrating an example of a UDP packet configuration according to the embodiment of the present invention. FIG. 5 is a flowchart illustrating a UDP packet generation process in the UDP networking method according to the embodiment of the present invention.

As illustrated in FIG. 2, a plurality of terminals are connected via NAT (Network Address Translation) routers and firewalls (not illustrated) in a UDP network according to an embodiment of the present invention.

The terminals include both transmission peers and reception peers. As illustrated in FIG. 2, the terminals may include desktop computers or various servers as well as mobile terminals.

Furthermore, the terminals are connected to each other through the network, and the network includes P2P communication using a wired/wireless communication network.

The NAT router may indicate an Internet sharer, and serve to enable a plurality of hosts (computers) to share only one Internet address allocated to the NAT router.

Although not illustrated, the network may further include firewalls through which the terminals are connected to each other. At this time, the firewall may indicate a security system which selectively accepts, rejects or corrects information transmitted between the network and the Internet. The firewall may be embodied by a separate device or implemented as an independent function within the NAT router.

Hereafter, the UDP networking method for stability improvement according to the embodiment of the present invention will be described in detail with reference to the accompanying drawings.

As illustrated in FIG. 3, the UDP networking method according to the embodiment of the present invention starts with step S110 in which a transmission terminal receives a data transmission command.

Then, the transmission terminal generates a UDP packet to transmit data through UDP at step S120.

The UDP packet structure and the UDP packet generation process according to the embodiment of the present invention will be described in detail with reference to FIGS. 4 and 5. As illustrated in FIG. 5, the transmission terminal fragments transmission data into one or more packets according to the UDP rule at step S121, in order to generate the UDP packet.

At this time, the basic configured of the UDP packet (datagram) according to the embodiment of the present invention includes a header and a data recordable area as illustrated in FIG. 5. Specifically, the UDP packet is divided into a UDP L4 header and a payload, and the pay load includes an H header and a user payload in which message data are recorded.

As illustrated in FIG. 5, the H header 100 includes garbling data 130, sequence data 110 and transmission/reception hash data 120.

In order to form the H header 100, the transmission terminal generates the sequence data 110 indicating the serial numbers of the fragmented UDP packets at step S123. The sequence data 110 are configured by sequentially numbering the respective datagrams.

In the basic configuration, the sequence data according to the present embodiment are formed in the H header. If necessary, however, the sequence data 110 may be included in the UDP L4 header area formed in the UDP packet.

Then, the transmission terminal calculates the transmission/reception hash data 120 by combining a transmission terminal ID and a reception terminal ID, at step S125.

The transmission/reception hash data 120 are generated through an operation of combining the transmission terminal ID and the reception terminal ID into a preset length (for example, 32-bit integer type) and then hashing the combined information. The hashing may include various methods such as an XOR operation.

The transmission/reception hash data 120 may not only be used for the reception terminal to combine the received UDP packets, but also used to filter a wrong UDP packet when a NAT router transmitted the wrong UDP packet to the reception terminal.

That is, the hash data may be used to correct a malfunction which occurs in the NAT router having a complex configuration. When the NAT router malfunctions, data received by the NAT router may be routed (transmitted) to a different reception terminal. At this time, the reception terminal receiving wrong data can recognize that the wrong data were routed to the reception terminal, through the hash value, and discard the corresponding data, thereby removing the data transmission error.

Then, the transmission terminal calculates the garbling data 130 and adds the calculated garbling data 130 to the head of the H header 100, at step S127.

At this time, the garbling data 130 may be set to one-byte data calculated by performing an XOR operation on the first byte of the sequence data 110 and the first byte of the hash data 120.

The garbling data 130 makes it impossible to detect a pattern which occurs due to the sequential characteristic of the sequence data 110 and the identity of the transmission/reception hash data 120 in the UDP packet, thereby preventing a distortion of the UDP packet by a firewall.

The transmission terminal completes the UDP packet by configuring the H header 100 of the UDP packet according to the above-described method.

The transmission terminal transmits the generated UDP packet to the reception terminal at step S130. At this time, the UDP packet is transmitted to the reception terminal through the NAT router.

The NAT router receiving the transmission packet detects the pattern of the UDP packet at step S210. At this time, since the pattern of the UDP packet according to the present embodiment is concealed by the garbling data 130, the NAT router does not detect the pattern of the UDP packet, but transmits the UDP packet to the reception terminal, at step S220.

When the reception terminal receives the UDP packet at step S310, the reception terminal recognizes the transmission/reception hash data 120 of the received UDP packet, and determines whether the corresponding UDP packet is a normal packet, at step S320. At this time, since the reception terminal recognizes the transmission terminal ID, the reception terminal ID and the hash operator, the reception terminal can recognize the normal transmission/reception hash data 120 of the UDP packet.

When the determination result of step S320 indicates that the received UDP packet is a normal packet, the reception terminal checks the UDP sequence data 110 at step S330, and arranges the received UDP packet and the previously received UDP packets, thereby completing the data reception process at step S340.

At this time, the data reception process may include generating output data by combining the received packets.

When the determination result of step S320 indicates that the received UDP packet is a wrong UDP packet or a damaged UDP packet and the check result for the UDP sequence data 110 at step S330 indicates that a part of the packets is omitted, the reception terminal performs a data error process at step S350.

The data error process basically indicates a process of discarding a wrong UDP packet or damaged UDP packet. Furthermore, the data error process may include storing the reception detail of damaged UDP packets and the omission detail of the UDP packets, and detecting a data error pattern, at step S351.

The data error pattern refers to the type of a data transmission error (packet damage or omission) or an occurrence cycle (time interval or data transmission length).

The reception terminal generates an error report message in a form for transmitting the error pattern to the transmission terminal, at step S353.

The error report message is included in a check message transmitted to the transmission terminal from the reception terminal, and transmitted to the transmission terminal, at step S360.

At this time, the check message may indicate a message which the reception terminal connected through UDP communication periodically transmits to the transmission terminal. The reception terminal may periodically generate the check message at a preset time cycle, and transmit the check message to the transmission terminal.

Then, the transmission terminal receiving the check message extracts the error pattern from the check message at steps S410 and S420, and resets the packet transmission pattern by reflecting the error pattern at step S430.

That is, when the error pattern detection result indicates that a data transmission error occurs at each time cycle, the transmission terminal may set a time step for packet transmission at each time cycle, thereby reducing the occurrence of data transmission error. Furthermore, when the error pattern detection result indicates that a data transmission error occurs according to a predetermined data transmission length, the transmission terminal may set a time step for packet transmission at each data transmission length, thereby reducing the occurrence of data transmission error.

The scope of the present invention is not limited to the above-described embodiments but defined as described in claims, and it is apparent to those skilled in the art that various modifications and variations can be made within the scope of right described in claims.

INDUSTRIAL APPLICABILITY

The present invention relates to the UDP networking method which improves the stability against a data damage occurring during transmission by configuring an additional heater area in a UDP transmission packet. According to the present invention, the UDP networking method can secure processing stability against duplicated data by adding a specific header area containing sequence data in a UDP transmission packet, and a reception terminal (peer) can transmit an error analysis result on a packet damage and omission to a transmission terminal to correct a transmission packet. Therefore, the UDP networking method can improve the stability against a packet omission and damage while maintaining the real time flexibility which is a unique advantage of UDP.

The invention claimed is:

1. A user datagram protocol (UDP) networking method for stability improvement, comprising the steps of:
   generating, by a transmission terminal, a UDP packet by fragmenting transmission data on a packet basis;
   transmitting, by the transmission terminal, the generated UDP packet to a reception terminal;
   determining, by the reception terminal, whether the received UDP packet has an error;
   storing, by the reception terminal, error information on UDP packet reception and detecting an error pattern;
   transmitting, by the reception terminal, the detected error pattern to the transmission terminal; and
   resetting, by the transmission terminal, a packet transmission pattern based on the error pattern.

2. The UDP networking method of claim 1, wherein generating the UDP packet comprises the steps of:
   fragmenting the transmission data into one or more UDP packets according to the UDP rule;
   generating sequence data indicating the serial numbers of the fragmented UDP packets;
   calculating transmission/reception hash data by performing a hash operation on data obtained by combining a transmission terminal identifier (ID) and a reception terminal ID;
   calculating garbling data by combining the sequence data and the transmission/reception hash data; and
   generating a header by combining the sequence data, the transmission/reception data and the garbling data, and inserting the header into the fragmented UDP packets.

3. The UDP networking method of claim 2, wherein the transmission/reception hash data is generated through an operation of combining the transmission terminal ID and the reception terminal ID into a preset length and hashing the combined information through an exclusive OR (XOR) operation.

4. The UDP networking method of claim 3, wherein the header comprises the garbling data, the sequence data and the transmission/reception hash data which are sequentially arranged with the garbling data set to the head thereof.

5. The UDP networking method of claim 3, wherein determining, by the reception terminal, whether the received UDP packet has the error comprises the steps of:
   checking the reception terminal through the transmission/reception hash data of the received UDP packet, and determining whether a transmission address has an error;
   checking the reception terminal through the transmission/reception hash data of the received UDP packet, and determining whether a transmission address has an error;
   determining whether omitted packets are present, based on the sequence data of the received UDP packets; and
   checking the received UDP packets to determine whether the received UDP packets are damaged.

6. The UDP networking method of claim 2, wherein the garbling data comprises one-byte data calculated by performing an XOR operation on the first byte of the sequence data and the first byte of the transmission/reception hash data.

7. The UDP networking method of claim 6, wherein determining, by the reception terminal, whether the received UDP packet has the error comprises the steps of:
   checking the reception terminal through the transmission/reception hash data of the received UDP packet, and determining whether a transmission address has an error;
   checking the reception terminal through the transmission/reception hash data of the received UDP packet, and determining whether a transmission address has an error;
   determining whether omitted packets are present, based on the sequence data of the received UDP packets; and
   checking the received UDP packets to determine whether the received UDP packets are damaged.

8. The UDP networking method of claim 6, wherein the header comprises the garbling data, the sequence data and the transmission/reception hash data which are sequentially arranged with the garbling data set to the head thereof.

9. The UDP networking method of claim 2, wherein the header comprises the garbling data, the sequence data and the transmission/reception hash data which are sequentially arranged with the garbling data set to the head thereof.

10. The UDP networking method of claim 2, wherein determining, by the reception terminal, whether the received UDP packet has the error comprises the steps of:
   checking the reception terminal through the transmission/reception hash data of the received UDP packet, and determining whether a transmission address has an error;
   checking the reception terminal through the transmission/reception hash data of the received UDP packet, and determining whether a transmission address has an error;
   determining whether omitted packets are present, based on the sequence data of the received UDP packets; and
   checking the received UDP packets to determine whether the received UDP packets are damaged.

11. The UDP networking method of claim 1, wherein the header comprises the garbling data, the sequence data and the transmission/reception hash data which are sequentially arranged with the garbling data set to the head thereof.

12. The UDP networking method of claim 1, wherein determining, by the reception terminal, whether the received UDP packet has the error comprises the steps of:
   checking the reception terminal through the transmission/reception hash data of the received UDP packet, and determining whether a transmission address has an error;
   checking the reception terminal through the transmission/reception hash data of the received UDP packet, and determining whether a transmission address has an error;
   determining whether omitted packets are present, based on the sequence data of the received UDP packets; and
   checking the received UDP packets to determine whether the received UDP packets are damaged.

13. The UDP networking method of claim 12, wherein the error pattern comprises a time-based occurrence cycle of a packet transmission error,
   the packet transmission pattern comprises a damage or omission of a received packet, and
   resetting, by the transmission terminal, the packet transmission pattern based on the error pattern comprises setting a time step for packet transmission at a time cycle corresponding to the occurrence cycle of the packet transmission error.

14. The UDP networking method of claim 12, wherein the error pattern comprises an occurrence cycle of a packet transmission error based on the amount of transmitted packets,
   the packet transmission error comprises a damage or omission of a received packet, and resetting, by the transmission terminal, the packet transmission pattern based on the error pattern comprises setting a time step for packet transmission at a packet transmission cycle corresponding to the occurrence cycle of the packet transmission error.

* * * * *